US007773938B2

(12) United States Patent
Voto

(10) Patent No.: US 7,773,938 B2
(45) Date of Patent: Aug. 10, 2010

(54) APPARATUS AND METHOD FOR FM WIRELESS VEHICLE SYSTEM INTERFACE

(75) Inventor: Robert M. Voto, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 529 days.

(21) Appl. No.: 11/838,202

(22) Filed: Aug. 13, 2007

(65) Prior Publication Data

US 2008/0214101 A1 Sep. 4, 2008

Related U.S. Application Data

(60) Provisional application No. 60/867,568, filed on Nov. 28, 2006.

(51) Int. Cl.
*H04H 40/00* (2008.01)
*H04H 20/74* (2008.01)

(52) U.S. Cl. ..................... 455/3.02; 455/3.06; 455/90.3

(58) Field of Classification Search ................ 455/3.01, 455/3.02, 3.06, 41.2, 41.3, 550.1, 556.1, 455/575.9, 90.3

See application file for complete search history.

(56) References Cited

U.S. PATENT DOCUMENTS 5,361,305 A 11/1994 Easley et al.
6,396,164 B1 * 5/2002 Barnea et al. .............. 307/10.1
6,472,771 B1 * 10/2002 Frese et al. ................ 307/10.1
6,493,546 B2 * 12/2002 Patsiokas ................. 455/277.1
6,549,774 B1 * 4/2003 Titlebaum et al. ........... 455/427
6,810,233 B2 * 10/2004 Patsiokas ................... 455/3.02
7,260,356 B2 * 8/2007 Helstrom et al. ........... 455/3.02
7,587,167 B2 * 9/2009 Bator et al. ................ 455/3.01
2008/0062053 A1 * 3/2008 Marko et al. ................ 343/713

* cited by examiner

*Primary Examiner*—Sonny Trinh
(74) *Attorney, Agent, or Firm*—Thomas N. Twomey

(57) ABSTRACT

A vehicle system interface comprises an antenna configured to receive a digital radio signal, a digital radio receiver circuit configured to receive the digital radio signal from the antenna and to obtain digital audio data from the digital radio signal, an FM modulator and transmitter circuit, and a microprocessor in operable communication with the digital radio receiver circuit and the FM modulator and transmitter circuit. The microprocessor is configured to generate a first message requesting a series of FM radio signal levels and the microprocessor is also configured to select a suitable FM radio frequency from the series of FM radio frequencies. The microprocessor is also configured to induce the FM modulator and transmitter circuit to broadcast the digital audio data in an FM radio signal over the suitable FM radio frequency.

23 Claims, 2 Drawing Sheets

Figure 1:
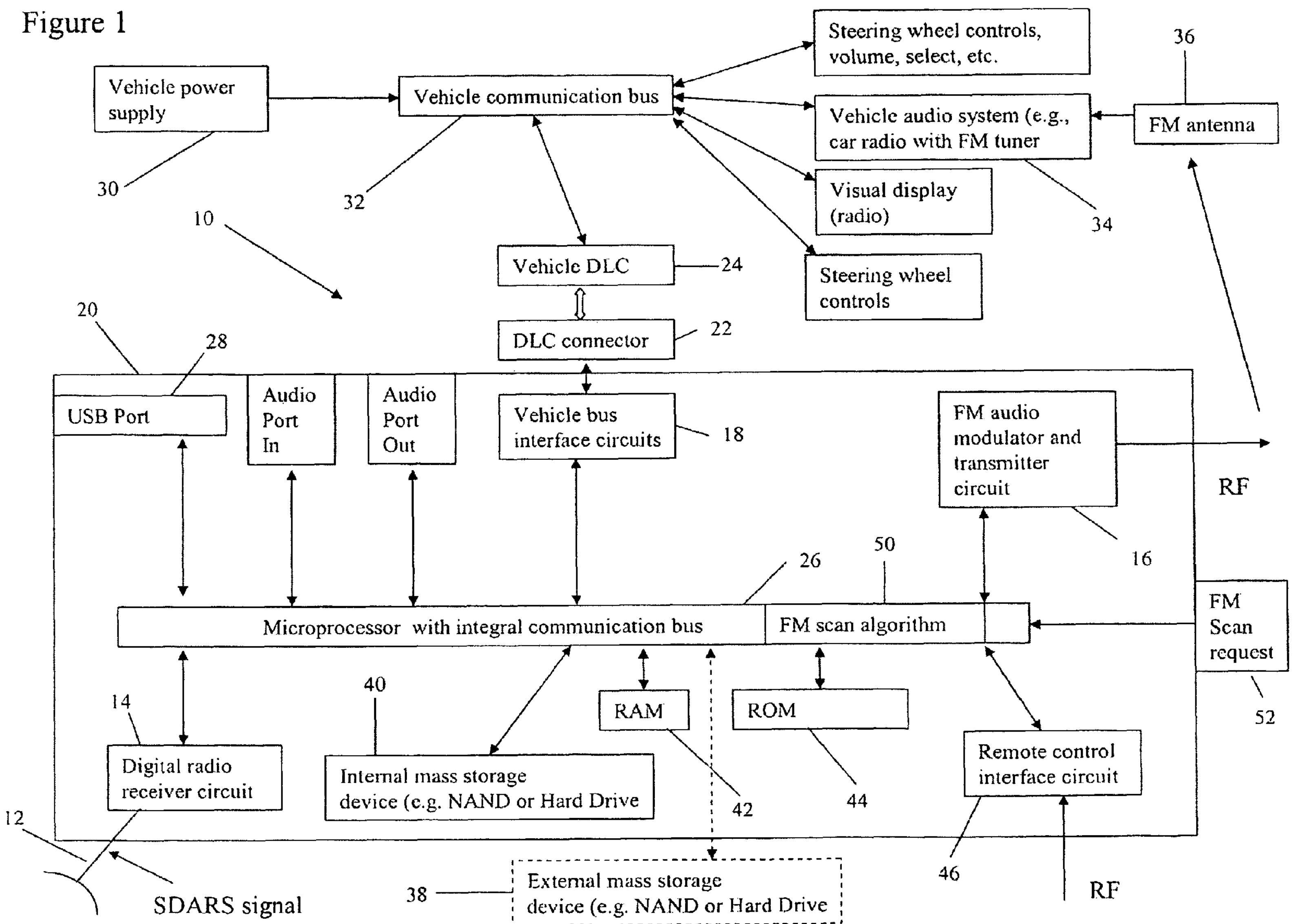

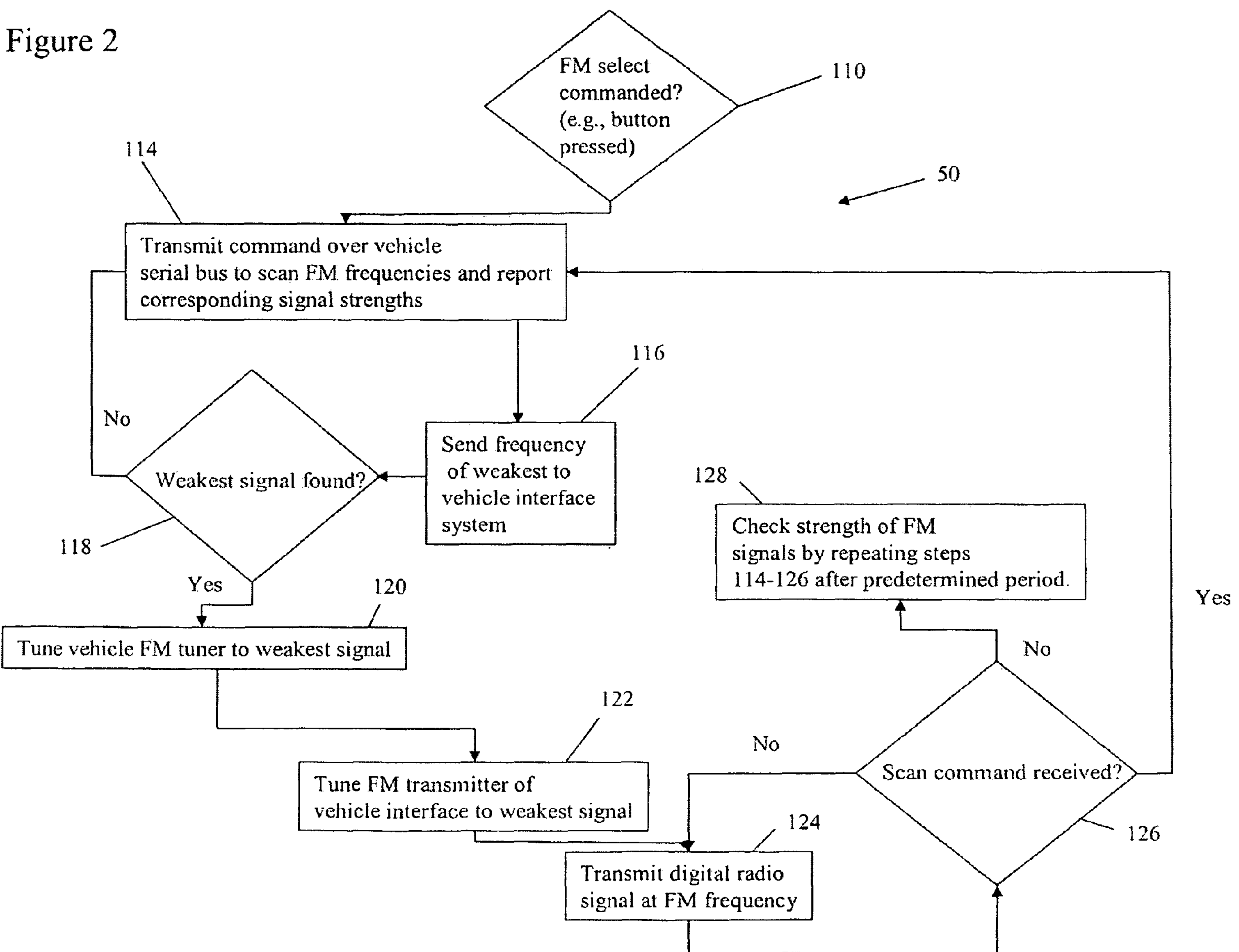
Figure 2
FM select commanded? (e.g., button pressed)
110
50
114
Transmit command over vehicle serial bus to scan FM frequencies and report corresponding signal strengths
116
No
Weakest signal found?
Send frequency of weakest to vehicle interface system
128
Check strength of FM signals by repeating steps 114-126 after predetermined period.
118
Yes
120
Yes
Tune vehicle FM tuner to weakest signal
No
122
No
Tune FM transmitter of vehicle interface to weakest signal
Scan command received?
124
126
Transmit digital radio signal at FM frequency

APPARATUS AND METHOD FOR FM WIRELESS VEHICLE SYSTEM INTERFACE

CROSS REFERENCE TO RELATED APPLICATION

This application is related to commonly owned and assigned U.S. Provisional Patent Application No. 60/867,568, filed Nov. 28, 2006, the contents of which are incorporated herein by reference thereto.

BACKGROUND

Exemplary embodiments of the present invention relate to a vehicle system interface, and, more specifically, exemplary embodiments of the present invention relate to an apparatus and method for providing an interface to a vehicle control system for use with non-factory installed consumer products.

Digital broadcast radio services such as a satellite digital audio radio service (SDARS) use one or more communications satellites to broadcast audio and advanced multimedia programs to subscribers. The satellite broadcasts can be received by satellite radio receivers at home, at business locations, or in mobile environments like the automobile.

An aftermarket portable satellite radio receiver will typically have its own built in displays and controls, and can be removable from the vehicle. Accordingly, when such a device is connected for use with the vehicle control system, the vehicle operator will need to use and synchronize two sets of controls: one for a factory installed vehicle audio system (for example, a CD player, AM/FM radio, and/or cassette player, etc.) and one for the receiver.

To transmit audio signals to the vehicle audio system, aftermarket auxiliary or external audio devices have utilized FM transmitters to transmit the audio signals to the system's FM radio receiver for play on the vehicle's speaker system. This requires the vehicle operator to setup the transmission by selecting the FM radio frequency. The vehicle operator must select an FM radio frequency that does not have a strong competing FM broadcast signal from local radio stations at the time of selection. This setup process therefore necessitates that the vehicle operator scan the available FM stations on the vehicle's FM tuner to find one that is open for transmission from the audio device. Once the vehicle operator locates a suitable FM radio frequency, the vehicle operator must then tune both the FM transmitter and the vehicle's FM tuner to that frequency.

While this setup method can work adequately for the intended purpose, it also presents major drawbacks for consumers. For example, the procedure is not intuitively obvious to many users and requires them to learn how to make the product function correctly. Additionally, even for proficient users, the procedure requires significant user attention and interaction, and therefore can be difficult to complete while driving. Moreover, even when executed correctly, the result of the procedure is only valid for a limited geographic area. As the vehicle moves into and out of various FM radio broadcast coverage areas, the transmission may encounter strong competing signals at the selected frequency, prompting the vehicle to perform the setup process repeatedly.

Accordingly, the inventors herein have recognized that it is desirable to provide a device that can interface the existing vehicle audio system with a non-factory installed audio device without requiring the vehicle owner to use and synchronize two sets of controls.

SUMMARY

Exemplary embodiments of the present invention are related to a vehicle system interface that comprises an antenna configured to receive a digital radio signal, a digital radio receiver circuit configured to receive the digital radio signal from the antenna and to obtain digital audio data from the digital radio signal, an FM modulator and transmitter circuit, and a microprocessor in operable communication with the digital radio receiver circuit and the FM modulator and transmitter circuit. The microprocessor is configured to generate a first message requesting a series of FM radio signal levels corresponding to a series of FM radio frequencies being received by an FM radio receiver. The microprocessor is configured to send the first message through an electrical connector to a control system in operable communication with the FM radio receiver. The microprocessor is configured to receive a second message from the control system through the electrical connector indicating the series of FM radio signal levels. The microprocessor is configured to select a suitable FM radio frequency from the series of FM radio frequencies based upon the corresponding series of FM radio signal levels. The microprocessor is configured to generate a third message instructing the control system to tune the FM radio receiver to the suitable FM radio frequency. The microprocessor is configured to send the third message through the electrical connector to the control system. The microprocessor is configured to transmit the digital audio data from the digital radio receiver circuit to the FM modulator and transmitter circuit. The microprocessor is configured to induce the FM modulator and transmitter circuit to broadcast the digital audio data in an FM radio signal over the suitable FM radio frequency.

Exemplary embodiments of the present invention are also related to a method for transmitting digital audio data. The method comprises receiving the digital audio data. The method further comprises generating a first message requesting a series of FM radio signal levels corresponding to a series of FM radio frequencies being received by an FM radio receiver. The method further comprises sending the first message through an electrical connector to a control system in operable communication with the FM radio receiver. The method further comprises receiving a second message from the control system through the electrical connector indicating the series of FM radio signal levels. The method further comprises selecting a suitable FM radio frequency from the series of FM radio frequencies based upon the corresponding series of FM radio signal levels. The method further comprises generating a third message instructing the control system to tune the FM radio receiver to the suitable FM radio frequency. The method further comprises sending the third message through the electrical connector to the control system. The method further comprises broadcasting the digital audio data in an FM radio signal over the suitable FM radio frequency.

Exemplary embodiments of the present invention are also related to a system for transmitting a digital radio signal to an FM radio receiver. The system comprises a control system in operable communication with the FM radio receiver, an electrical connector operably coupled to the control system, and a vehicle system interface operably coupled to the electrical connector. The FM radio receiver comprises an FM antenna, an FM tuner, and a speaker system. The electrical connector is configured to provide communication between the vehicle system interface and the control system. The vehicle system interface comprises an antenna configured to receive a digital radio signal, a digital radio receiver circuit configured to receive the digital radio signal from the antenna and to obtain digital audio data from the digital radio signal, an FM modulator and transmitter circuit, and a microprocessor in operable communication with the digital radio receiver circuit and the FM modulator and transmitter circuit. The microprocessor is configured to generate a first message requesting a series of FM radio signal levels corresponding to a series of FM radio frequencies being received by the FM antenna. The microprocessor is configured to send the first message through the electrical connector to the control system. The microprocessor is configured to receive a second message from the control system through the electrical connector indicating the series of FM radio signal levels. The microprocessor is configured to select a suitable FM radio frequency from the series of FM radio frequencies based upon the corresponding series of FM radio signal levels. The microprocessor is configured to generate a third message instructing the control system to tune the FM tuner to the suitable FM radio frequency. The microprocessor is configured to send the third message through the electrical connector to the control system. The microprocessor is configured to transmit the digital audio data from the digital radio receiver circuit to the FM modulator and transmitter circuit. The microprocessor is configured to induce the FM modulator and transmitter circuit to broadcast the digital audio data in an FM radio signal over the suitable FM radio frequency.

Exemplary embodiments of the present invention are also related to a vehicle system interface that comprises a digital audio receiver configured to receive digital audio data, a transmitter operably connected to the digital audio receiver to receive the digital audio data therefrom, an electrical connector configured to operably connect with a diagnostic link connector of a vehicle to provide communication with a control system of the vehicle, and a control circuit operably connected to the electrical connector and the transmitter. The control circuit is configured to communicate with the control system of the vehicle through the electrical connector to request and receive a series of FM radio signal levels corresponding to a series of FM radio frequencies being received by an FM radio receiver of the vehicle. The control circuit is further configured to select a suitable FM radio frequency from the series of FM radio frequencies based upon the corresponding series of FM radio signal levels. The control circuit is further configured to communicate with the control system through the electrical connector to instruct the control system to tune the FM radio receiver to the suitable FM radio frequency. The control circuit is further configured to induce the transmitter to broadcast the digital audio data in an FM radio signal over the suitable FM radio frequency.

The above-described and other features of the present disclosure will be appreciated and understood by those skilled in the art from the following detailed description, drawings, and appended claims.

DRAWINGS

FIG. 1 is a schematic of a vehicle system interface in accordance with an exemplary embodiment of the present invention; and FIG. 2 is a flow chart of a method implemented by the exemplary vehicle system interface of FIG. 1 in accordance with an exemplary embodiment of the present invention.

DESCRIPTION OF EXEMPLARY EMBODIMENTS

In accordance with exemplary embodiments of the present invention, a vehicle system interface is provided for connecting an aftermarket auxiliary or external audio device with the controls and displays of an existing vehicle control system without requiring a vehicle operator to use and synchronize two sets of controls. In non-limiting exemplary embodiments, audio devices that can be connected with the existing vehicle system include, for example, satellite radio receivers and other digital audio broadcast receivers, digital audio players such as Ipods and other MP3 players, portable CD players, and navigation systems such as GPS.

In exemplary embodiments that will now be described, a vehicle system interface provides for communication with an existing vehicle control system through the vehicle diagnostic link connector (DLC). Under current government mandates, each vehicle produced for sale in the United States, for model years 1996 and afterwards, must include a DLC. While physical transport layer protocols vary among vehicle manufacturers, this connector provides a universal functionality set for all vehicles manufactured in the U.S. There exist at least three known major protocols: GM Class II (J1850 VPW), Ford SAP (J1850 PWM) and Keyword 2000, also known as ISO-9141-2/14230.

Each DLC is easily accessible and intended to provide a connection through which diagnostic scan tools can access the vehicle fault codes or other vehicle system performance parameters. Furthermore, the DLC also provides a connection to the general vehicle system communication bus and can thereby provide access to many other vehicle systems controls, displays, status indicators, etc. In particular, the DLC, through the general vehicle system communication bus, can be utilized to access and communicate with the vehicle audio or entertainment system controls, displays, etc.

Accordingly, exemplary embodiments of the present invention are directed to apparatuses and methods involving a vehicle system interface that connects to the DLC of a vehicle to integrate an audio device with an existing vehicle audio system such that a vehicle operator can control the integrated audio system without requiring the vehicle operator to use and synchronize two sets of controls. Moreover, in exemplary embodiments, the end consumer can easily connect the vehicle system interface to the vehicle without performing any vehicle disassembly, re-wiring, or reprogramming of the vehicle system.

In accordance with a non-limiting exemplary embodiment schematically illustrated in FIG. 1, a vehicle system interface designed to retransmit a digital radio signal carrying digital audio data that is received by a digital radio receiver from a Satellite Digital Audio Radio Service (SDARS), such as XM Radio, Sirius, or WorldSpace, to an audio system of a vehicle is provided. It should be noted that, in alternative non-limiting exemplary embodiments, the vehicle system interface is contemplated for use with and can be configured for use with other devices from which digital audio signals can be retransmitted, such as other digital audio broadcast receivers, digital audio players such as Ipods and other MP3 players, portable CD players, navigation systems such as GPS, etc. Moreover, in exemplary embodiments, the vehicle system interface is contemplated as a portable device configured to plug into an aftermarket auxiliary or external audio device through, for example, a headphone jack or a proprietary output port. In alternative exemplary embodiments, the vehicle system interface is contemplated for use as a component of the audio device.

In exemplary embodiments, retransmission of the digital radio signal will be accomplished by receiving an available digital audio signal broadcast by a communications satellite (for example, the S Band signal used in North America or the L Band signal generally used elsewhere), converting the satellite radio signal to an FM radio signal, and transmitting the radio signal over a selected FM radio frequency to provide the audio content of the digital audio signal to an FM radio receiver installed within the vehicle. It should be noted that, in alternative exemplary embodiments, digital radio signals governed by other digital audio broadcasting standards, such as DAB, DAB+, FM IBOC (e.g., HD Radio), AM IBOC, ISDB-TSB, DMB, DVB-H, RDS, radio pagers, etc., may be retransmitted. It should also be noted that, in alternative exemplary embodiments, the digital audio signal can be converted to other radio signals and transmitted over a radio frequency on another radio band, such as AM, Shortwave, Citizens', VHF, UHF, etc.

Referring now to FIG. 1, a schematic illustration of the present exemplary embodiment of a vehicle system interface device is provided. Vehicle system interface 10 comprises a compact housing 20 having an FM audio modulator and transmitter circuit 16, a digital radio receiver circuit 14, and a vehicle bus interface circuit 18 operably coupled with an electrical DLC connector 22. DLC connector 22 is configured to operably connect with a DLC 24 of a vehicle to provide for communication between vehicle system interface 10 and the vehicle communication bus 32.

Vehicle system interface 10 also includes a satellite radio antenna 12 configured to receive the digital radio signal fed from the applicable SDARS and transmit the same to receiver circuit 14, which is configured to receive, decode, and demodulate the digital radio signal obtain corresponding digital audio data. FM audio modulator and transmitter circuit 16 is configured to receive the digital audio data from receiver circuit 14 and frequency modulate the digital audio data in an FM radio signal, then wirelessly broadcast the FM radio signal over a selected FM radio frequency for reception by an FM antenna 36 of the vehicle audio system 34. In non-limiting exemplary embodiments, FM audio modulator and transmitter circuit 16 can be configured to transmit the FM radio signal over a range of up to about 75 feet.

In the present exemplary embodiment, vehicle bus interface circuit 18 is configured to transmit a plurality of operational signals between vehicle system interface 10 and vehicle communication bus 32 when DLC connector 22 is connected to DLC 24. Thus, DLC connector 22, through communication with vehicle bus interface circuit 18, serves to operably connect vehicle system interface 10 to DLC 24. When so connected, vehicle system interface 10 is able to send control signals to and receive control signals from vehicle communication bus 32. As illustrated in FIG. 1, vehicle system interface 10 can receive its power from the vehicle power supply 30 through DLC 24 when connected with DLC connector 22. Therefore, in non-limiting exemplary embodiments, the vehicle system interface is not required to provide an external power supply. In alternative exemplary embodiments, the vehicle system interface can be battery driven or configured to draw power from the vehicle's cigarette lighter socket.

Vehicle system interface 10 also includes a control circuit or microprocessor 26 located within housing 20. To initiate the selection of a suitable FM radio frequency over which the digital audio data obtained from the digital radio signal can be transmitted to an FM radio receiver installed within the vehicle, the present exemplary embodiment includes an FM auto select or scan request button 52 installed on the periphery of housing 20. When the vehicle operator presses scan request button 52, an initiate selection signal is sent to microprocessor 26. In alternative non-limiting exemplary embodiment, other devices or techniques can be utilized for prompting vehicle system interface 10 to initiate the selection of a suitable FM radio frequency. For example, the selection can be initiated upon startup of the vehicle or upon startup of the audio device.

Microprocessor 26 is operably coupled to vehicle bus interface circuit 18 and programmed to communicate with vehicle communication bus 32 when DLC connector 22 is connected to DLC 24. In exemplary embodiments, microprocessor 26 may be programmable, for example, via a USB port 28 operably connected to the microprocessor within housing 20. For example, software updates may be provided to microprocessor 26 through USB port 28 with instructions on how vehicle system interface 10 is to communicate with the aftermarket or external audio device and/or the vehicle control system with which it is interfaced through DLC 24. Alternatively, microprocessor 26 can be programmed via a device specific remote control configured to interact with a remote control interface circuit 46 of vehicle system interface 10.

In the present exemplary embodiment, microprocessor 26 is configured to communicate with the vehicle audio system's FM tuner through DLC 24 to request and receive a series of FM radio signal levels corresponding to a series of FM radio frequencies presently being received by FM antenna 36. For example, microprocessor 26 can be programmed, by transmitting messages to vehicle communication bus 32 through DLC 24, to send a request for and receive a diagnostic mode scan of FM radio signal levels across the FM radio frequency spectrum. Such a diagnostic mode scan is similar to a car radio's automatic station scan function, but rather than reporting the frequency for each station presently receiving a signal of at least a predetermined strength, the scan reports the signal strength at each of the FM radio frequencies that can be received by the vehicle's FM tuner. In exemplary embodiments, the vehicle's FM tuner can be configured receive, and FM audio modulator and transmitter circuit 16 can be configured to transmit, FM radio signals across any suitable FM band such as, for example, the VHF band, which extends from 30 MHz to 300 MHz, or the 87.9 to 107.9 MHz band used in the U.S. Furthermore, in exemplary embodiments, the frequency of the stations of the applicable FM band from which signals can be received by the vehicle's FM tuner (and thus reported to microprocessor 26 during a diagnostic mode scan) can be any suitable nominal frequency across the band such as, for example, multiples of 100 kHz or "half-channel" multiples of 50 kHz.

As depicted in FIG. 1, vehicle system interface 10 is further configured with an FM scan algorithm 50 that is programmed to check the strength of the FM radio signal levels received during the diagnostic mode scan and select a suitable FM radio frequency from the series of FM radio frequencies based upon the corresponding series of FM radio signal levels. Microprocessor 26 loads FM scan algorithm 50 from a ROM storage component 44 into a RAM storage component 42 for execution.

In non-limiting exemplary embodiments, FM scan algorithm 50 can be programmed to select the FM radio frequency of the first FM radio signal level received that is weaker than a predetermined signal level. Alternatively, in non-limiting exemplary embodiments, FM scan algorithm 50 can be programmed to select the FM radio frequency of the weakest signal presently being received by FM antenna 36. In exemplary embodiments, FM scan algorithm 50 can comprise machine readable code stored on a storage medium of vehicle system interface 10 and utilize one or more electronic limiters.

In the present exemplary embodiment, microprocessor 26 is further configured to, after selecting a suitable FM radio frequency, communicate with vehicle communication bus 32 via DLC 24 to command vehicle audio system 34 to tune its FM tuner to the FM radio frequency selected by FM scan algorithm 50. For example, microprocessor 26 can transmit tune up or tune down commands to vehicle communication bus 32 through DLC 24, and vehicle audio system 34 can receive the commands over the vehicle communication bus and execute them to tune its FM tuner to the selected frequency. Alternatively, in non-limiting exemplary embodiments in which the vehicle audio system does not support the functional messaging that is needed to respond to such a tuning command, the vehicle system interface can be configured to visually or audibly prompt the vehicle operator to manually tune the FM tuner of the vehicle audio system to the FM radio frequency selected by FM scan algorithm 50. In exemplary embodiments, microprocessor 26 can be programmed to communicate with vehicle communication bus 32 to determine if this functional messaging and operational manipulation is supported by vehicle audio system 34.

As depicted in FIG. 1, microprocessor 26 is also configured to transmit the digital audio data obtained by radio receiver circuit 14 to FM audio modulator and transmitter circuit 16. As described above, FM audio modulator and transmitter circuit 16 is configured to receive the digital audio data and frequency modulate it in an FM radio signal, then wirelessly broadcast the corresponding FM radio signal over an FM radio frequency for reception by FM antenna 36 of vehicle audio system 34. In the present exemplary embodiment, the digital audio data is obtained from a digital radio signal fed to antenna 12 from an applicable SDARS. Thus, in exemplary embodiments in which the applicable SDARS data signal is proprietary, radio receiver circuit 14 can be configured to decode and demodulate the digital radio signal in accordance with the applicable SDARS to obtain the digital audio data that is transmitted to FM audio modulator and transmitter circuit 16.

To configure vehicle audio system 34 to play the digital radio signal received by radio receiver circuit 14, after a suitable FM radio frequency has been selected by FM scan algorithm 50, microprocessor 26 is configured to command FM audio modulator and transmitter circuit 16 to broadcast the FM radio signal over the selected FM radio frequency. When the vehicle audio system's FM tuner is tuned to this frequency as described above, the signal will be played over the vehicle audio system's speaker system as it is picked up by FM antenna 36.

In non-limiting exemplary embodiments, microprocessor 26 can comprise any control circuit that is configured to execute or capable of being programmed to execute the prescribed functionality and commands described above. For instance, microprocessor 26 can comprise a special-purpose embedded processor or a general-purpose processor in exemplary embodiments and include a microcontroller, a CPU, a system-on-a-chip, a digital signal processor, an audio processor, a soft microprocessor, a quantum computer, and/or another equivalent control or processing device. Furthermore, in non-limiting exemplary embodiments, to perform the prescribed functions, processing, computations, and the like described herein, microprocessor 26 may include one or more of the following: ALUs, pipelines, memory or storage components such as registers and caches, timing circuitry such as clock drivers and couners, interrupts, system interconnects such as computer buses and switches, input/output peripheral interfaces, etc. In the exemplary embodiment illustrated in FIG. 1, digital audio data can also be stored in and transmitted from an internal hard drive 40 operably connected to microprocessor 26 and/or an external mass storage device 38 coupled to housing 20 to connect with microprocessor 26. In non-limiting exemplary embodiments, external mass storage device 38 can comprise, for instance, the digital audio data stored internally on a digital audio player, such as previously purchased digital recordings on an Ipod.

Referring now to FIG. 2, a flow chart illustrating the operation of a non-limiting exemplary embodiment of FM scan algorithm 50 is provided. The exemplary process to be described can be implemented, for example, using exemplary vehicle system interface 10 as described above to interface an audio device supplying digital audio data and a vehicle audio system. To perform FM scan algorithm 50, such a vehicle system interface is configured to receive and transmit signals through the vehicle communications bus by accessing the vehicle DLC to cause the vehicle audio system to scan for available frequencies, select a suitable FM radio frequency, and transmit signals commanding both the FM tuner of the vehicle audio system and an FM transmitter of the vehicle system interface to tune to this frequency so that digital audio data can be transmitted wirelessly therebetween. This process, to be described in greater detail below, can provide a simple, quick, and safe way of synchronizing the audio device to the vehicle audio system.

In the present exemplary embodiment, the vehicle system interface will initially be programmed according to the vehicle make and model in which it will be used and/or the digital audio device or digital audio signal that it will retransmit. This can be accomplished, in a non-limiting exemplary embodiment, by connecting a PC-based application to the vehicle system interface via a suitable external interface, such as USB port 28 in the exemplary embodiment of FIG. 1. In an alternative exemplary embodiment, the vehicle system interface can be programmed via a device specific remote control configured to interact with a remote control interface circuit (for example, circuit 46 in FIG. 1) of the vehicle system interface. In another alternative exemplary embodiment, the device can be preprogrammed according to the applicable vehicle make and model and/or the applicable digital audio device at the factory. In exemplary embodiments, additional control behaviors can also be programmed into the device, such as station presets, audio settings, frequency modulation frequencies, etc. These additional aspects can, for example, be programmed during the initial programming or by user initiated programming utilizing the control features of the vehicle after the vehicle system interface has been connected through the vehicle's DLC.

To prepare the vehicle system interface to receive a digital audio signal and transmit corresponding digital audio data in an FM radio signal to the vehicle's FM antenna, the vehicle operator can install the interface by connecting it to the vehicle DLC and to the audio device supplying the digital audio signal (for example, SDARS antenna 12 in FIG. 1). Once installed, the device sleeps in a low-power state until a prompt for an FM scan command is received at step 110 in FIG. 2 to initiate FM scan algorithm 50. Such a request can be prompted, in non-limiting exemplary embodiments, by the vehicle operator pressing an FM scan request button, upon startup of the vehicle, or upon startup of the audio device supplying the digital audio signal. In non-limiting exemplary embodiments, FM scan algorithm 50 can be loaded into suitable storage component of the vehicle system interface (such as RAM storage component 42 in FIG. 1) for execution by a control circuit or microprocessor upon the first occurrence of such a prompt, or, alternatively, the algorithm can be pre-loaded in a suitable memory component or as a control circuit of the vehicle system interface.

As shown in the exemplary embodiment of FIG. 2, after the FM select command is received at step 110, FM scan algorithm 50 then commands the vehicle system interface to access the vehicle communication bus through the vehicle DLC and initiate communication with the vehicle audio system's FM tuner to request and receive a series of FM radio signal levels corresponding to a series of FM radio frequencies presently being received by the vehicle's FM antenna. At step 114, the vehicle system interface transmits a command for a diagnostic mode scan of FM radio signal levels across the vehicle FM tuner's frequency spectrum. At step 116, the scan reports the signal strength at each FM radio frequency that can be received by the vehicle's FM tuner to the vehicle system interface.

In the present exemplary embodiment, as the series of signal levels is received at step 116, FM scan algorithm interactively examines the signal levels to determine the FM radio frequency corresponding to the weakest FM radio signal level received at step 118. At step 120, the FM scan algorithm 50 selects the FM radio frequency over which the weakest signal level was reported and transmits a signal instructing the vehicle system interface to communicate with the vehicle communication bus through the vehicle DLC to command the vehicle audio system to tune its FM tuner to the selected FM radio frequency. In a non-limiting example, the vehicle system interface can transmit tune up or a tune down commands to the vehicle communication bus through the DLC, and the vehicle audio system can receive the commands from the vehicle communication bus and execute them to tune its FM tuner to the selected frequency. Alternatively, in non-limiting exemplary embodiments in which the vehicle audio system does not support the functional bus messaging and/or control mechanisms to receive and respond such a tuning command, the vehicle system interface can be configured to visually or audibly prompt the vehicle operator to manually tune the vehicle's FM tuner to the FM radio frequency selected by FM scan algorithm 50.

At step 122, FM scan algorithm 50 transmits a signal instructing the vehicle system interface to tune its FM transmitter circuit to the selected FM radio frequency. As a result, at step 124, the vehicle system interface's FM transmitter will transmit an FM radio signal having the digital audio data received over the selected FM radio frequency. As described above with reference to the exemplary embodiment of FIG. 1, to perform step 124, the vehicle system interface can be configured to receive the digital audio signal and obtain digital audio data therefrom, then utilize a built-in FM transmitter to wirelessly broadcast the digital audio data in an FM radio signal over the selected FM radio frequency for reception by the FM antenna of the vehicle audio system. Consequently, because the vehicle audio system's FM tuner was tuned to the selected frequency at step 120, the FM radio signal will be played by the vehicle's speaker system as it is received by the vehicle's FM antenna.

In the present exemplary embodiment, at step 126, FM scan algorithm is configured to repeat the process described above in steps 114-124 when a prompt for a new FM scan/select request is received. Such a request can be prompted, for example, each time the vehicle operator presses the FM scan request button. For instance, when the vehicle enters an area with a competing FM radio signal on the selected FM radio frequency, the vehicle operator is able to initiate a scan for another frequency with a single button touch that is simple, safe, and causes minimal distraction. The request can also be prompted upon re-startup of the vehicle or upon re-startup of the audio device supplying the digital audio signal. In the present exemplary embodiment, FM scan algorithm 50 is also configured, at step 128, to periodically and automatically issue commands to perform an FM scan for available frequencies and, if necessary, re-tune the radio and FM transmitter to a more suitable frequency, without being prompted.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A vehicle system interface, comprising:

an antenna configured to receive a digital radio signal;

a digital radio receiver circuit configured to receive the digital radio signal from the antenna and to obtain digital audio data from the digital radio signal;

an FM modulator and transmitter circuit;

a microprocessor in operable communication with the digital radio receiver circuit and the FM modulator and transmitter circuit, the microprocessor being configured to generate a first message requesting a series of FM radio signal levels corresponding to a series of FM radio frequencies being received by an FM radio receiver, the microprocessor being configured to send the first message through an electrical connector to a control system in operable communication with the FM radio receiver, the microprocessor being configured to receive a second message from the control system through the electrical connector indicating the series of FM radio signal levels, the microprocessor being configured to select a suitable FM radio frequency from the series of FM radio frequencies based upon the corresponding series of FM radio signal levels, the microprocessor being configured to generate a third message instructing the control system to tune the FM radio receiver to the suitable FM radio frequency, the microprocessor being configured to send the third message through the electrical connector to the control system, the microprocessor being configured to transmit the digital audio data from the digital radio receiver circuit to the FM modulator and transmitter circuit, the microprocessor being configured to induce the FM modulator and transmitter circuit to broadcast an FM radio signal having the digital audio data over the suitable FM radio frequency.

2. The vehicle system interface of claim 1, wherein the digital radio signal comprises a satellite broadcast fed from a Satellite Digital Audio Radio Service to the antenna, and wherein the digital radio receiver circuit is configured to decode and demodulate the digital radio signal to obtain the digital audio data.

3. The vehicle system interface of claim 1, wherein the FM radio receiver comprises a vehicle FM radio receiver, wherein the control system comprises a vehicle control system of a vehicle in operable communication with the vehicle FM radio receiver, and wherein the electrical connector is configured to operably connect with a diagnostic link connector of the vehicle to provide communication with the vehicle control system.

4. The vehicle system interface of claim 3, wherein the electrical connector is configured to receive electric power for the vehicle system interface from a power supply of the vehicle through the diagnostic link connector of the vehicle.

5. The vehicle system interface of claim 1, wherein the FM radio receiver comprises an FM antenna, an FM tuner, and a speaker system, and wherein the FM modulator and transmitter circuit is configured to broadcast the FM radio signal for reception by the FM antenna.

6. The vehicle system interface of claim 1, further comprising a bus interface circuit operably connecting the microprocessor to the electrical connector, the bus interface circuit being configured to transmit data between the microprocessor and the control system through the electrical connector.

7. The vehicle system interface of claim 1, wherein the microprocessor comprises a processing unit selected from microcontrollers, CPUs, system-on-a-chips, digital signal processors, audio processors, soft microprocessors, quantum processors, and combinations thereof.

8. The vehicle system interface of claim 1, wherein the microprocessor is configured to select an FM radio frequency corresponding to a first FM radio signal level of the series of FM radio signal levels that is weaker than a predetermined signal level as the suitable FM radio frequency.

9. The vehicle system interface of claim 1, wherein the microprocessor is configured to select an FM radio frequency corresponding to the weakest FM radio signal level of the series of FM radio signal levels as the suitable FM radio frequency.

10. The vehicle system interface of claim 1, further comprising a housing for the microprocessor, the digital radio receiver circuit, and the FM modulator and transmitter circuit.

11. The vehicle system interface of claim 10, further comprising an external button disposed on the periphery of the housing, the external button being operably connected to the microprocessor, the external button being configured to generate a signal instructing the microprocessor to initiate the scan, the external button being configured to send the signal to the microprocessor when pressed.

12. The vehicle system interface of claim 1, wherein the microprocessor is configured to receive a fourth message from the control system through the electrical connector indicating a startup of the FM radio receiver, and wherein the microprocessor is configured to generate the first message upon receiving the fourth message.

13. The vehicle system interface of claim 1, wherein the microprocessor is configured to generate the first message upon startup of the vehicle system interface.

14. The vehicle system interface of claim 1, wherein the microprocessor is configured to periodically and automatically generate the first message in order to re-select the suitable FM radio frequency.

15. The vehicle system interface of claim 1, further comprising a USB port operably coupled to the microprocessor, the USB port being configured to receive a set of instructions for programming the microprocessor.

16. The vehicle system interface of claim 1, further comprising a remote control interface circuit operably coupled to the microprocessor, the remote control interface circuit being configured to receive a set of instructions for programming the microprocessor.

17. A method for transmitting digital audio data, the method comprising:

receiving digital audio data;

generating a first message requesting a series of FM radio signal levels corresponding to a series of FM radio frequencies being received by an FM radio receiver;

sending the first message through an electrical connector to a control system in operable communication with the FM radio receiver;

receiving a second message from the control system through the electrical connector indicating the series of FM radio signal levels;

selecting a suitable FM radio frequency from the series of FM radio frequencies based upon the corresponding series of FM radio signal levels;

generating a third message instructing the control system to tune the FM radio receiver to the suitable FM radio frequency;

sending the third message through the electrical connector to the control system; and broadcasting the digital audio data in an FM radio signal over the suitable FM radio frequency.

18. A system for transmitting a digital radio signal to an FM radio receiver, the system comprising:

a control system in operable communication with the FM radio receiver, the FM radio receiver comprising an FM antenna, an FM tuner, and a speaker system;

an electrical connector operably coupled to the control system;

a vehicle system interface operably coupled to the electrical connector, the electrical connector configured to provide communication between the vehicle system interface and the control system, the vehicle system interface comprising:

an antenna configured to receive a digital radio signal;

a digital radio receiver circuit configured to receive the digital radio signal from the antenna and to obtain digital audio data from the digital radio signal;

an FM modulator and transmitter circuit;

a microprocessor in operable communication with the digital radio receiver circuit and the FM modulator and transmitter circuit, the microprocessor being configured to generate a first message requesting a series of FM radio signal levels corresponding to a series of FM radio frequencies being received by the FM antenna, the microprocessor being configured to send the first message through the electrical connector to the control system, the microprocessor being configured to receive a second message from the control system through the electrical connector indicating the series of FM radio signal levels, the microprocessor being configured to select a suitable FM radio frequency from the series of FM radio frequencies based upon the corresponding series of FM radio signal levels, the microprocessor being configured to generate a third message instructing the control system to tune the FM tuner to the suitable FM radio frequency, the microprocessor being configured to send the third message through the electrical connector to the control system, the microprocessor being configured to transmit the digital audio data from the digital radio receiver circuit to the FM modulator and transmitter circuit, the microprocessor being configured to induce the FM modulator and transmitter circuit to broadcast the digital audio data in an FM radio signal over the suitable FM radio frequency.

19. A vehicle system interface, comprising:

a digital audio receiver configured to receive digital audio data;

a transmitter operably connected to the digital audio receiver to receive the digital audio data therefrom;

an electrical connector configured to operably connect with a diagnostic link connector of a vehicle to provide communication with a control system of the vehicle; and a control circuit operably connected to the electrical connector and the transmitter, the control circuit being configured to communicate with the control system of the vehicle through the electrical connector to request and receive a series of FM radio signal levels corresponding to a series of FM radio frequencies being received by an FM radio receiver of the vehicle, the control circuit being further configured to select a suitable FM radio frequency from the series of FM radio frequencies based upon the corresponding series of FM radio signal levels, the control circuit being further configured to communicate with the control system through the electrical connector to instruct the control system to tune the FM radio receiver to the suitable FM radio frequency, the control circuit being further configured to induce the transmitter to broadcast the digital audio data in an FM radio signal over the suitable FM radio frequency.

20. The vehicle system interface of claim 19, wherein the digital audio receiver is configured to receive the digital audio data from an audio device comprising one or more of a digital audio broadcast antenna, a satellite radio antenna, a digital audio player, an Ipod, an MP3 player, a portable CD player, a navigation system, and a portable DVD player.

21. The vehicle system interface of claim 20, wherein the vehicle system interface further comprises a peripheral interface configured to operably connect the digital audio receiver with the audio device.

22. The vehicle system interface of claim 20, wherein the vehicle system interface further comprises the audio device, and wherein the digital audio receiver is operably coupled to the audio device.

23. The vehicle system interface of claim 20, wherein the audio device is a satellite radio antenna, wherein the digital audio data comprises a satellite radio broadcast signal fed from a Satellite Digital Audio Radio Service to the satellite radio antenna, and wherein the digital radio receiver is configured to decode and demodulate the satellite radio broadcast signal.

* * * * *